United States Patent [19]
Richardson et al.

[11] 3,799,207
[45] Mar. 26, 1974

[54] QUICK ATTACHABLE ENCLOSURE FOR CONDUITS
[75] Inventors: William D. Richardson, Palos Heights; Ronald A. Zurawski, Chicago Ridge, both of Ill.
[73] Assignee: Tuthill Pump Company, Chicago, Ill.
[22] Filed: Sept. 7, 1972
[21] Appl. No.: 287,044

[52] U.S. Cl. ................................................. 138/89
[51] Int. Cl. ............................................. F16l 55/10
[58] Field of Search ...... 138/89, 90, 96 R; 292/256, 292/257; 285/305, 308, 311, 314, 315, 316, 320

[56] References Cited
UNITED STATES PATENTS
2,699,802   1/1955   Nilsson .............................. 138/90
1,297,719   3/1919   Myers .............................. 285/314 X FOREIGN PATENTS OR APPLICATIONS
847,163   6/1939   France .............................. 285/315

Primary Examiner—Charles A. Ruehl
Attorney, Agent, or Firm—Mann, Brown, McWilliams & Bradway

[57]  ABSTRACT

A quick attachable and detachable closure and seal for open ended conduits. A housing receives the conduit. A plunger in the housing seals against the end face of the conduit and a conduit gripper grips the exterior wall of the conduit.

6 Claims, 5 Drawing Figures

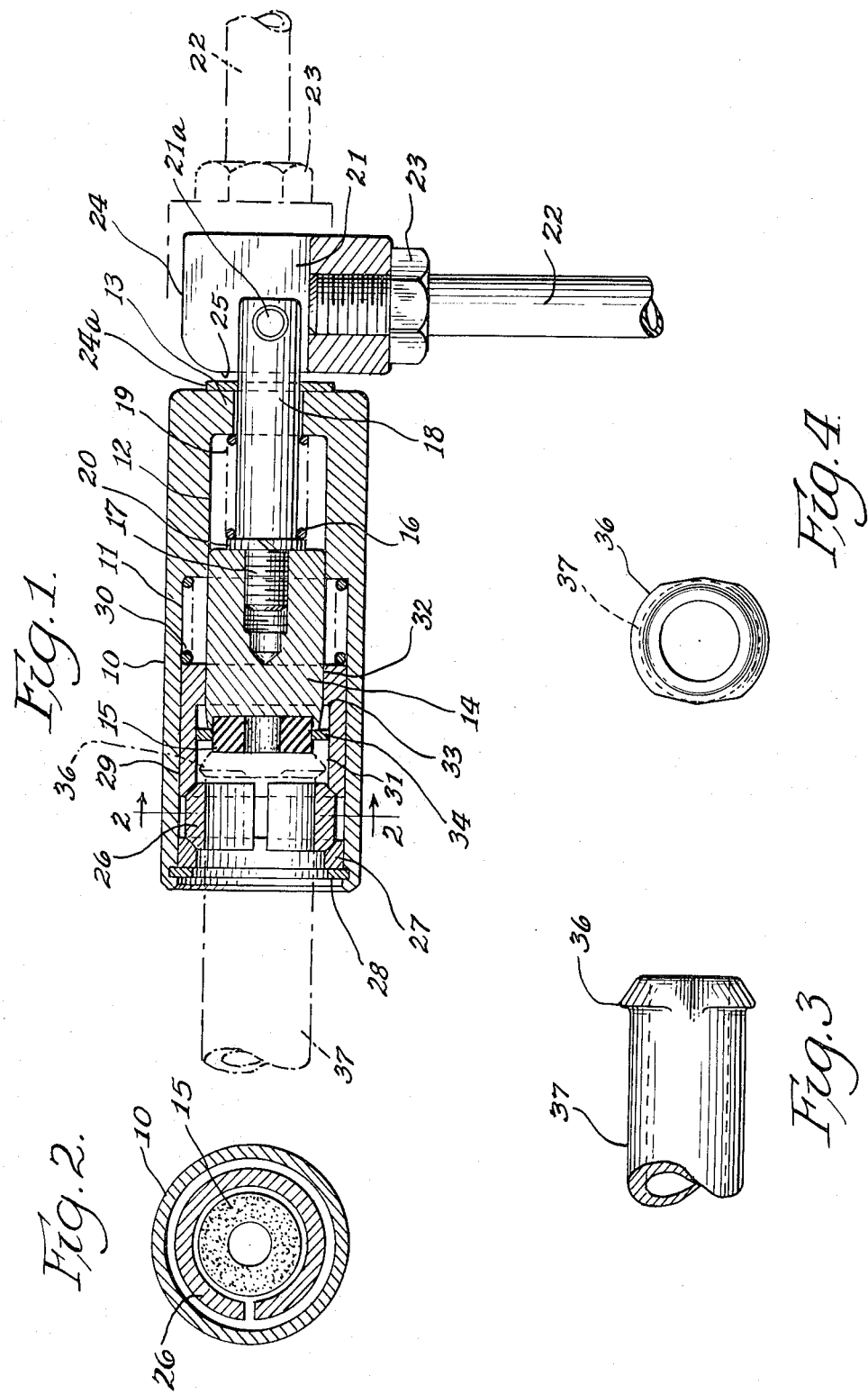

QUICK ATTACHABLE ENCLOSURE FOR CONDUITS

The present invention is directed to new and useful improvements in closing and sealing assemblies for exposed ends of flexible fluid carrying conduits.

In testing machinery it is sometimes desirable to close off fluid carrying conduits associated with the machinery either because the function of the conduits is unnecessary to the tests or because closure of a conduit may be a desirable parameter of the test. For example, when testing automotive engines it usually desirable to close off heater hose connections during the testing of the engine. Conduits of this type are flexible and in many cases have either a partial or a full bead formed around the open end thereof. It is desirable, in effecting such a closure, to provide a positive seal of the exposed end of the conduit and at the same time provide a closure assembly which is quickly attached to and detached from the conduit.

With the foregoing in mind the major purposes of the present invention are to provide a sealing and closing assembly for the exposed end of a flexible fluid carrying conduit which requires relatively little space, which effects a positive seal and closure for the exposed end of the conduit, while being securely attached to the same, to provide such a closure and sealing assembly which is quickly attached to and detached from the end of a conduit without requiring the use of threaded conduit connections, wrenches, screw drivers, pliers and the like, to form such an assembly in a manner requiring relatively little space in the area adjacent to the conduit to be sealed, and to form such an assembly in a simple and inexpensive fashion.

These and other objects will become more apparent in the course of the ensuing specification and claims when taken with the accompanying drawings, in which:

FIG. 1 is a sectional view of the closure and sealing assembly constituting the present invention and illustrating an operative conduit gripping and sealing position of the operating parts;

FIG. 2 is a sectional view of the assembly illustrated in FIG. 1 and taken on the section lines 2—2 of FIG. 1;

FIG. 3 is a side view of a portion of a typical exposed conduit to be sealed;

FIG. 4 is an end view of the conduit illustrated in FIG. 3; and

Like elements are designated by like characters throughout the specification and drawings.

Figure 5:
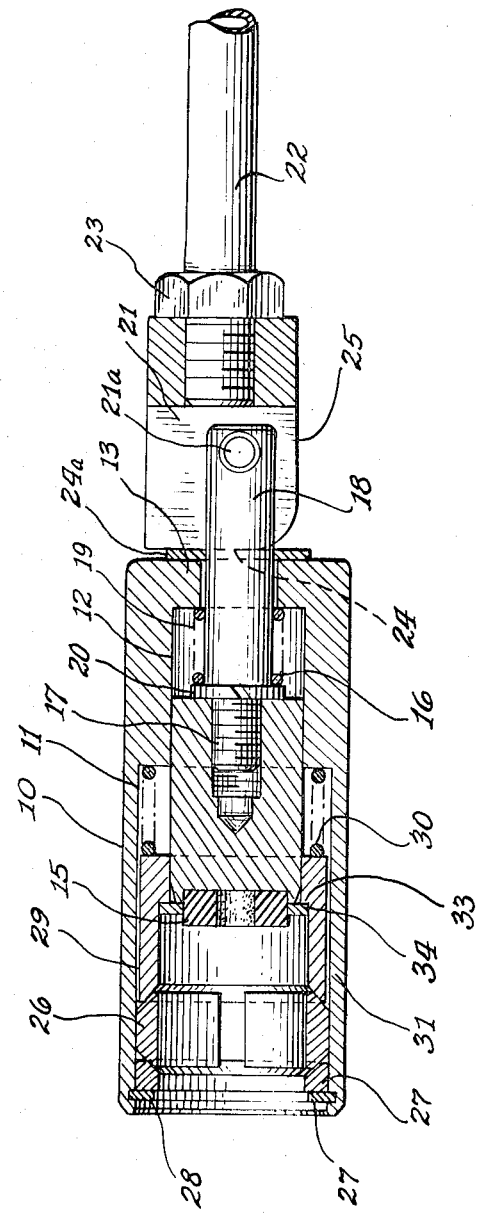
FIG. 5 is a sectional view similar to FIG. 1 while illustrating a different operative position of the parts than shown in FIG. 1, namely a loading or unloading position.

With specific reference now to the drawings, and in the first instance to FIG. 1, the numeral 10 designates a housing which has an elongated cylindrical form. Housing 10 is bored through a major portion of its length as at 11 and counterbored as at 12 throughout a substantial portion of the remainder of its length while leaving an end wall 13 remote from the open end of the housing. A plunger 14 has a diameter producing a running, sliding clearance with the counterbore 12. Plunger 14 includes a disc 15 of elastomeric, deformable sealing material which is seated in the end face of the plunger facing the open end of housing 10. Plunger 14 is slidably mounted in the counterbore 12 and is adapted to be reciprocated axially of the housing by means of a stem 16 which has one end screw threaded into the plunger as at 17 and an outer end 18 extending through end wall 13. A spring 19 biases plunger 14 towards the open end of the housing 10. Spring 19 extends between the inner face of wall 13 and a lock washer 20 positioned around the stem and bearing against the end of plunger 14.

Plunger 14 is adapted to be moved between the operative sealing position illustrated in FIG. 1 and what is termed a loading or unloading position which is illustrated in FIG. 5 by means of a cam 21 which is pivoted to the exposed exterior end of stem 16 as at 21a. Cam 21 includes a manipulating handle 22 which is threaded into cam 21 and fixed thereto by means of a lock nut 23. Cam 21 includes a first camming surface 24 extending transversely to the axis of handle 22 and positioned at a greater distance from the pivot 21a than a second camming surface 25 which is formed generally parallel to the axis of handle 22. The two surfaces 24 and 25 are joined by a curved surface as shown in the drawings.

By rotating handle 22 from a position extending transversely to the axis of the stem 16 and into a position of parallelism therewith, surface 24 moves against the end wall of the housing to pull stem 16 outwardly with respect to the housing or to the right in FIG. 1 and to the position illustrated in FIG. 5. It is preferred to provide a relatively hard bearing surface such as that defined by the washer 24a around the stem on the end wall of the housing for contact with the cam surface 24.

A conduit gripping means in the form of a split ring 26 is positioned in bore 11 between plunger 14 and the open end of the housing. Ring 26 is expansible and contractible radially. An outer stationery wedging ring 27, which is positioned between a retaining ring 28 seated in a groove in the inner wall of the bore 11 adjacent the outermost end thereof, contacts the outer side of the ring 26. A movable wedging sleeve 29 is slidably mounted in bore 11 and is adapted to bear against the other side of the ring. Sleeve 29 and ring 27 have bevelled surfaces in contact with the bevelled sides of ring 26.

Wedge sleeve 29 is biased towards the ring 26 by means of a coil spring 30 acting between the inner end of the sleeve and the shoulder between bore 11 and counterbore 12. Sleeve 29 has an internal diameter of stepped configuration. The larger internal diameter 31 is positioned closest to the ring 26. The smaller internal diameter 32 slidably engages the exterior surface of the cylindrical plunger 14. The shoulder 33 between these two diameters is adapted for engagement with a flange 34 formed on plunger 14 adjacent the sealing disc 15. The parts are proportioned so that when the handle 22 is in the locked or sealing position (FIG. 1), a short clearance space of lesser extent than the difference between the distance of the camming surfaces 24 and 25 from pivot 21a exists between the flange 34 and the shoulder 33. Thus, when handle 22 is moved to the loading position (FIG. 5) against the bias of spring 19, plunger 14 will move to the right in FIG. 1 for a short distance until flange 34 abuts the shoulder 33 to thus pull sleeve 29 away from the ring 26 against the bias of spring 30. Such retracting movement of the sleeve allows the ring 26, which is formed of a resilient material, to expand. In this respect the ring 26 has a normal, internal diameter slightly larger than a conduit with which it is to be used.

In utilizing the assembly, handle 22 is moved into the loading or unloading position illustrated in FIG. 5 wherein handle 22 is parallel to the axis of the housing. The exposed end of a conduit is then moved into the housing and through the ring 26 until the end face thereof abuts the sealing disc 15. At this time sleeve 29 is retracted away from the ring 26, allowing for some expansion thereof as the conduit passes therethrough. In those cases where a bead or partial bead 36 is formed on the end of the conduit 37, as illustrated in FIGS. 3 and 4, the passage of the bead may force some outer expansion of the ring 26 until it passes therethrough.

When the conduit is positioned with its end flush against the sealing disc 15, handle 22 is then rotated to the position illustrated in FIG. 1. This allows spring 19 to force plunger 14 toward the conduit to place a resilient sealing pressure between disc 15 and the conduit and in the course of that movement flange 34 is freed from its engagement with the shoulder 33. Spring 30 then forces the wedging sleeve 29 into engagement with the ring 26 to wedge the same radially inwardly in cooperation with the stationary wedging ring 27 until ring 26 securely grips the outer wall of the conduit. Both the exposed end face of the conduit and the sealing disc 15 may be deformed somewhat in effecting the seal therebetween. The ring 26, when positioned as illustrated in FIG. 1, positively holds the conduit in position and, in those cases where the conduit includes a bead 36, it forms an abutment precluding disassembly of the conduit from the sealing and closing assembly.

When the testing operation is over, the assembly is quickly and easily removed from the conduit by simply moving handle 22 to the loading and unloading position of FIG. 5 wherein the ring 26 is free to expand. The conduit is then easily removed from the assembly through relative axial movement of the conduit and housing.

The several parts of the assembly may be made of steel and spring steel in the case of the springs, except for the collet gripping ring 26 and the sealing disc 15. The collet gripping ring may be formed from steel but is preferably formed from a resilient and relatively hard plastic material. The sealing disc 15 may be formed from Neoprene rubber.

We claim:

1. A quick attachable and detachable closing and sealing assembly for the exposed ends of fluid carrying conduits including a hollow housing having a plunger slidably mounted therein, said housing having an open end and said plunger having a sealing disc on the end face thereof facing said open end, conduit gripping means positioned in said housing between the open end thereof and said plunger, actuating means for moving said plunger toward and awsy from said gripping means, and wedging means carried by said housing and engageable with said gripping means for causing a radial contraction of the same upon engagement therewith, said wedging means including a sleeve carried in said housing, said sleeve being mounted for limited axial movement relative to said plunger and for movement toward and away from said gripping means, means biasing said sleeve toward an actuating engagement with said gripping means, and means cooperable between said sleeve and said plunger for moving said sleeve away from said gripping means when said plunger moves away from said open end of said housing, whereupon an open ended conduit may be sealed and gripped by said assembly by abutment of the open end of the conduit against said sealing means and disengagement of said cooperable means to allow said sleeve to cause a radial gripping action of said gripping means on the exterior wall of said conduit.

2. The assembly of claim 1 wherein said actuating means includes a stem on said plunger, said stem being extended through the end of said housing remote from said open end, and manual actuating camming means cooperable with said stem for moving said plunger away from said conduit gripping means.

3. The assembly of claim 2 wherein said camming means includes a cam pivoted to the exposed exterior end of said stem and having a surface engageable with the end of said housing upon rotation of said cam to move said plunger away from said gripping means.

4. The assembly of claim 2 characterized by and including resilient means for biasing said plunger toward said conduit gripping means.

5. The assembly of claim 1 wherein said conduit gripping means is defined by a split ring and said wedging means includes a stationary wedging ring engageable with one side of said split ring and said sleeve includes a wedging surface engageable with the other side of said split ring.

6. The assembly of claim 1 wherein said cooperable means includes a flange carried by said plunger and engageable with a shoulder within said sleeve, said flange and shoulder being spaced from one another when said sleeve is in an actuating engagement with said gripping means.

* * * * *

PO-1050
(5/69)

UNITED STATES PATENT OFFICE
CERTIFICATE OF CORRECTION

Patent No. __3,799,207__   Dated __March 26, 1974__

Inventor(s) __William D. Richardson, et al__

It is certified that error appears in the above-identified patent and that said Letters Patent are hereby corrected as shown below:

Column 1, line 12, "it usually" should read --it is usually--; Column 2, line 24, "16" should be --18--; Column 2, line 26, "16" should be --18--; Column 3, line 18, "19" should be --16--.

Signed and sealed this 15th day of October 1974.

(SEAL)
Attest:

McCOY M. GIBSON JR.
Attesting Officer

C. MARSHALL DANN
Commissioner of Patents